United States Patent
Feld

(10) Patent No.: US 6,269,582 B1
(45) Date of Patent: Aug. 7, 2001

(54) ARTIFICIAL WEED LINE

(76) Inventor: Michael A. Feld, 1537 E. Hillsboro Blvd., Apt. 741, Deerfield Beach, FL (US) 33441

( * ) Notice: Subject to any disclaimer, the term of this patent is extended or adjusted under 35 U.S.C. 154(b) by 609 days.

(21) Appl. No.: 08/654,034

(22) Filed: May 28, 1996

(51) Int. Cl.$^7$ ................................................. A01K 61/00
(52) U.S. Cl. ................................................. 43/4; 119/233
(58) Field of Search .................. 119/233, 253; 43/4, 1

(56) References Cited

U.S. PATENT DOCUMENTS

| | | | |
|---|---|---|---|
| 3,186,120 | * 6/1965 | Layson | 43/4 X |
| 3,540,415 | * 11/1970 | Bromley | 119/3 |
| 3,638,615 | * 2/1972 | Budge et al. | 119/4 |
| 4,471,552 | 9/1984 | McIntosh et al. . | |
| 4,550,518 | 11/1985 | Layson . | |
| 4,727,672 | 3/1988 | Hill et al. . | |
| 4,876,817 | * 10/1989 | Hill | 43/1 |
| 5,272,829 | 12/1993 | Roberts et al. . | |
| 5,315,779 | * 5/1994 | Fussell | 43/4 |

* cited by examiner

Primary Examiner—Joseph J. Hail, III
Assistant Examiner—Anthony Ojini
(74) Attorney, Agent, or Firm—Malin, Haley & DiMaggio, P.A.

(57) ABSTRACT

A floating artificial weed line which attracts fresh or salt water fish. The invention is made of floating material preferably in the form of multiple floating panels connected together to form weed lines of any desired size. The panels are framed by a floating plastic water resilient structural material filed with a plastic material resembling sea weed. The weed lines can be used drifting or anchored to the bottom, and may be connected to a fishing boat.

10 Claims, 3 Drawing Sheets

ARTIFICIAL WEED LINE

BACKGROUND OF THE INVENTION

1. Field of the Invention

This invention relates generally to an artificial structure for attracting fish, and more particularly to an artificial floating weed line for attracting fresh or salt water fish of all types.

2. Description of Related Art

Artificial structures used to attract fish are known in the art. Generally speaking, the existing artificial fish attracting structures are bottom anchored and fully submerged in the water. Submerged structures are used because it is known that fish congregate around submerged structures.

For example, McIntosh et al., U.S. Pat. No. 4,471,552; Layson, U.S. Pat. No. 4,550,518; Hill et al., U.S. Pat. No. 4,727,672; Roberts et al., U.S. Pat. No. 5,272,829; and Fussell, U.S. Pat. No. 5,315,779 all provide bottom anchored submerged artificial structures that are intended to attract fish. Fisherman also know that fish congregate around and under floating objects, such as floating weed lines. None of the prior art references disclose a floating artificial fish attracting habitat.

McIntosh et al., U.S. Pat. No. 4,471,552, ('552) at column 1, lines 9–12, discloses that pelagic fish congregate around floating objects. One embodiment of '552 discloses a planar two dimensional fish attracting device submerged below a surface buoy within the first 20 feet of water depth. ('552 at col. 2, lines 27–35). However, the device of the '552 reference is a submerged, bottom moored, three dimensional artificial structure. There is no disclosure in the prior art of a floating artificial structure used to attract fish.

Fisherman often fish around weed lines because of the likelihood of catching fish. Because of wind, current, and tides, weed lines cannot always be found. Therefore, there exists a need for a floating artificial weed line that fisherman can easily use to attract fish.

SUMMARY OF THE INVENTION

The present invention is a floating artificial weed line that can be easily used by fishermen to attract various species of fresh or salt water fish. The artificial weed line imitates floating sea weed in fresh water, salt water, brackish water, or anywhere fish can be found. The weed line attracts fish as a source of shade and shelter or protection, and a source of food.

The essential structure of the present invention is a floating material which provides shade and an attraction to fish, and is easy to transport and handle.

One embodiment of the present invention utilizes a floating light-weight frame that can be made from any buoyant material, such as plastic that is water resilient. The frame itself can be held together by suitable fasteners such as stainless steel screws, staples, rivets, or dowels. While the frame is not necessary to the invention as the floating material can be buoyant by itself, it has been found to be convenient to utilize a frame.

The interior of the frame is filled with a material that can be made to resemble sea weed and provides shade to fish. The material can be made of a thin sheet of water resilient plastic or vinyl. The material can be strips of material fastened side to side and/or end to end to cover the frame. The material can be planar sheets and have a plurality of apertures therethrough. The apertures can be of an irregular pattern and can be small holes or cuts in the material. Although color is not limiting, the material is preferably opaque and can be green, or brown and green colored such as the material used to cover duck blinds. The material can be attached to the frame by any suitable fastener such as plastic cable ties, commonly called tie wraps, or stainless steel staples.

While shape is not important to operation of the invention, the plastic frames can be rectangular in shape and built in panels of any size. Panels of 18"×36" or 24"×48" have been found to be effective sizes. The panels can be tied together, by any suitable means such as line or plastic tie wraps, to form large simulated weed lines of any desired size. The panels can be stacked, carried offshore by small boat, and tied together as they are deployed to form large weed lines.

The artificial weed lines can be used in several different ways depending on the environmental conditions and the type of fish being sought. One method is to set out the floating weed line and let it drift on the surface while following or trolling around the weed line in a fishing boat.

The weed line can be tied to the boat with the weed line and the boat drifting along together or the fishing boat can be anchored to the bottom.

Alternately, the weed line can be anchored to the bottom. The weed line can be left in place for a period of time depending on the conditions. The area can be fished repeatedly as the fish will continue to be attracted to the same area near the artificial weed line.

The artificial weed line can also be used for surf fishing. On an outgoing tide, a few panels are placed as far out into the surf as possible with a line securing them to shore.

Accordingly, it is an objective of the present invention to provide a floating artificial weed line to attract fish, which can be used in any body of water in which fish can be found.

It is a further objective of the present invention to provide an artificial weed line that is easy to transport and use from small boats.

It is still a further objective of the present invention to provide an artificial weed line that is economical and easy to construct.

In accordance with these and other objects which will become apparent hereinafter, the instant invention will now be described with particular reference to the accompanying drawings.

DESCRIPTION OF THE PREFERRED EMBODIMENTS

Figure 1:
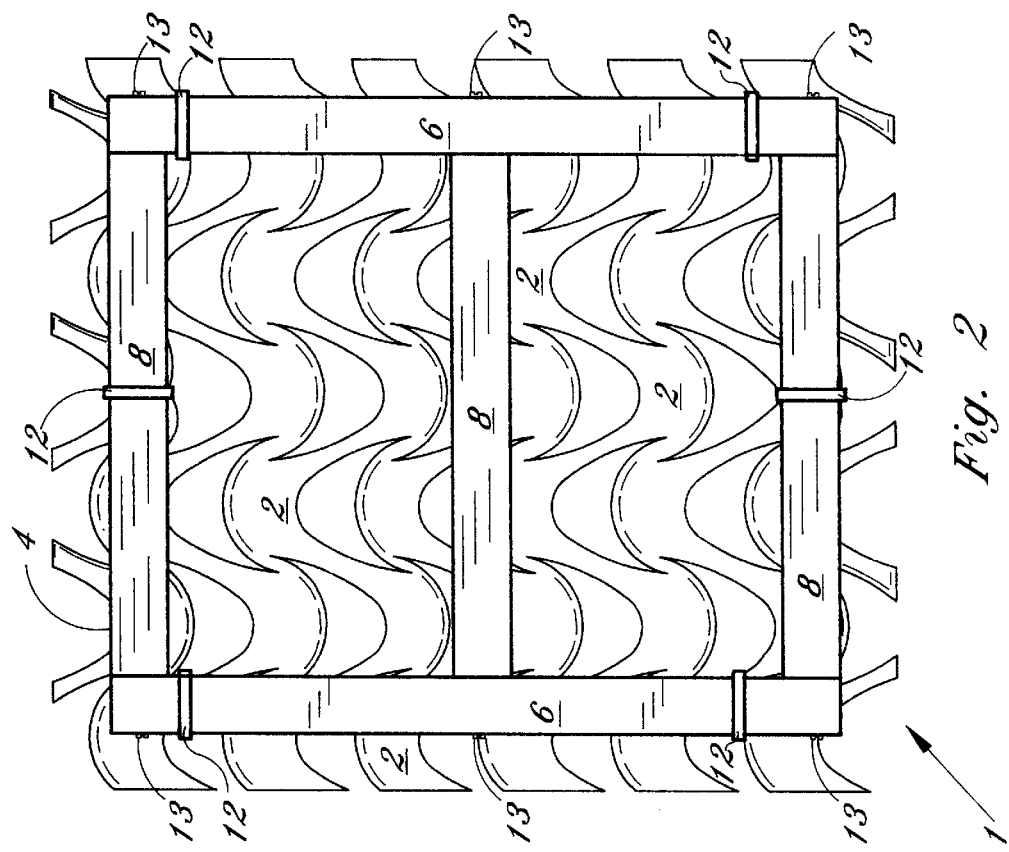
FIG. 1 is a top plan view of the present invention.
Figure 2:
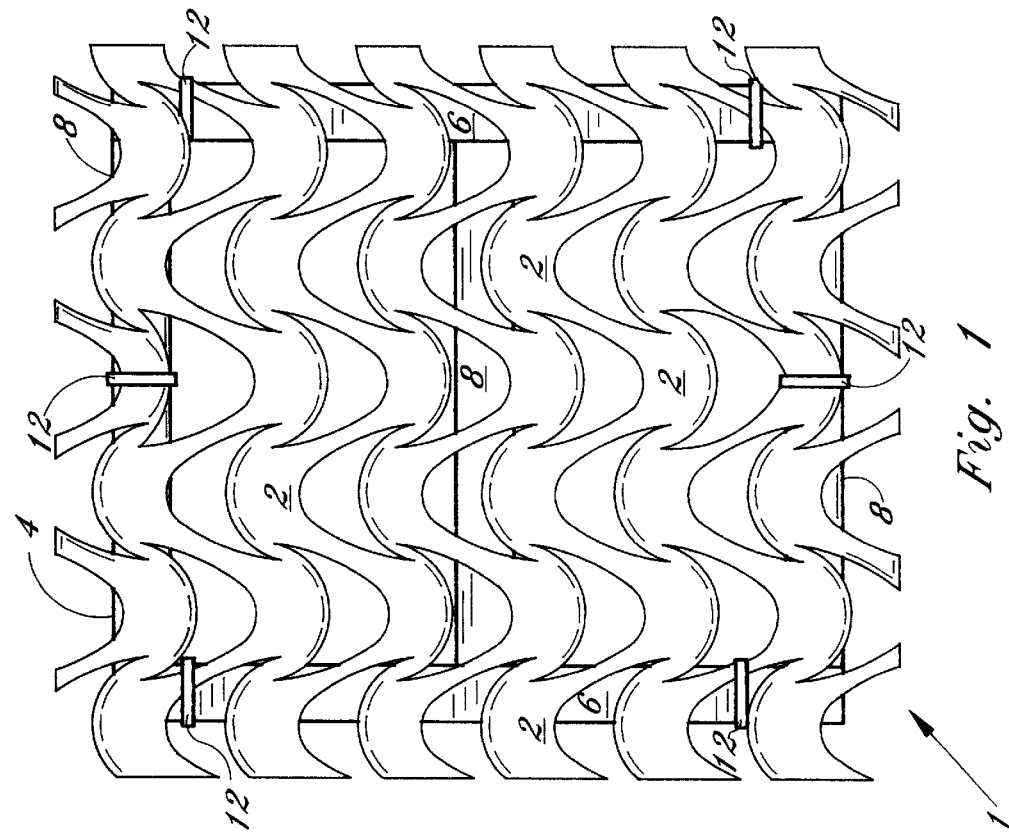
FIG. 2 is a bottom plan view of the present invention.

Referring now to FIGS. 1 and 2, the preferred embodiment of the present invention, shown generally as 1, is comprised primarily of flexible material 2 and frame 4.

Material 2 is preferably made of any suitable material such as vinyl or plastic and can be made to resemble sea weed. Material 2 can be planar and may have a plurality of apertures. The apertures can be in an irregular pattern and can be holes or cuts in the material. Material 2 can be strips laid end to end and/or side by side to cover frame 4. While color is not limiting, material 2 is preferably opaque, and can be green, or brown and green in color to resemble sea weed.

The vinyl material used currently to camouflage duck blinds has been found to be effective for material 2. However, fish seem to be attracted to nearly any floating object. The present invention is directed to providing a floating object that is easy to transport and handle. The preferred embodiment of the present invention is directed to a device that is easy to handle and transport, and that resembles weed. However, the invention is not intended to be limited to the look of sea weed attached to a frame. The invention is intended to cover alternate embodiments using material that does not resemble sea weed. Furthermore, material 2 can made from buoyant material and frame 4, which has been found to be convenient in the preferred embodiment, could be eliminated in an alternate embodiment.

Frame 4 of the preferred embodiment is made of any suitable buoyant material such as water resilient plastic. Frame 4 can be constructed in any desired shape such as round, square, triangular, etc. Frame 4 is preferably make in a rectangular shape using long plastic pieces 6 and a suitable number of short plastic pieces 8. The rectangular shape is advantageous for combining panels to form weed lines of different sizes. Panels of 18"×36" or 24"×48" have been found to be particularly effective. Long plastic pieces 6 and short plastic pieces 8 can be assembled using any suitable fasteners such as stainless steel screws 13, staples, or glue (not shown). Pieces 6 and 8 are shown in FIGS. 1 and 2 as rectangular in shape but can be cylindrical or any other suitable shape. Frame 4 can alternately be molded as one piece, or two, or other combination. (not shown).

Material 2 is attached by any suitable means to frame 4 such as tied with line, stapled (not shown), or with plastic cable ties (tie wraps) 12. Material 2 may include additional material which hangs down into the water from frame 4. (not shown).

Figure 3:
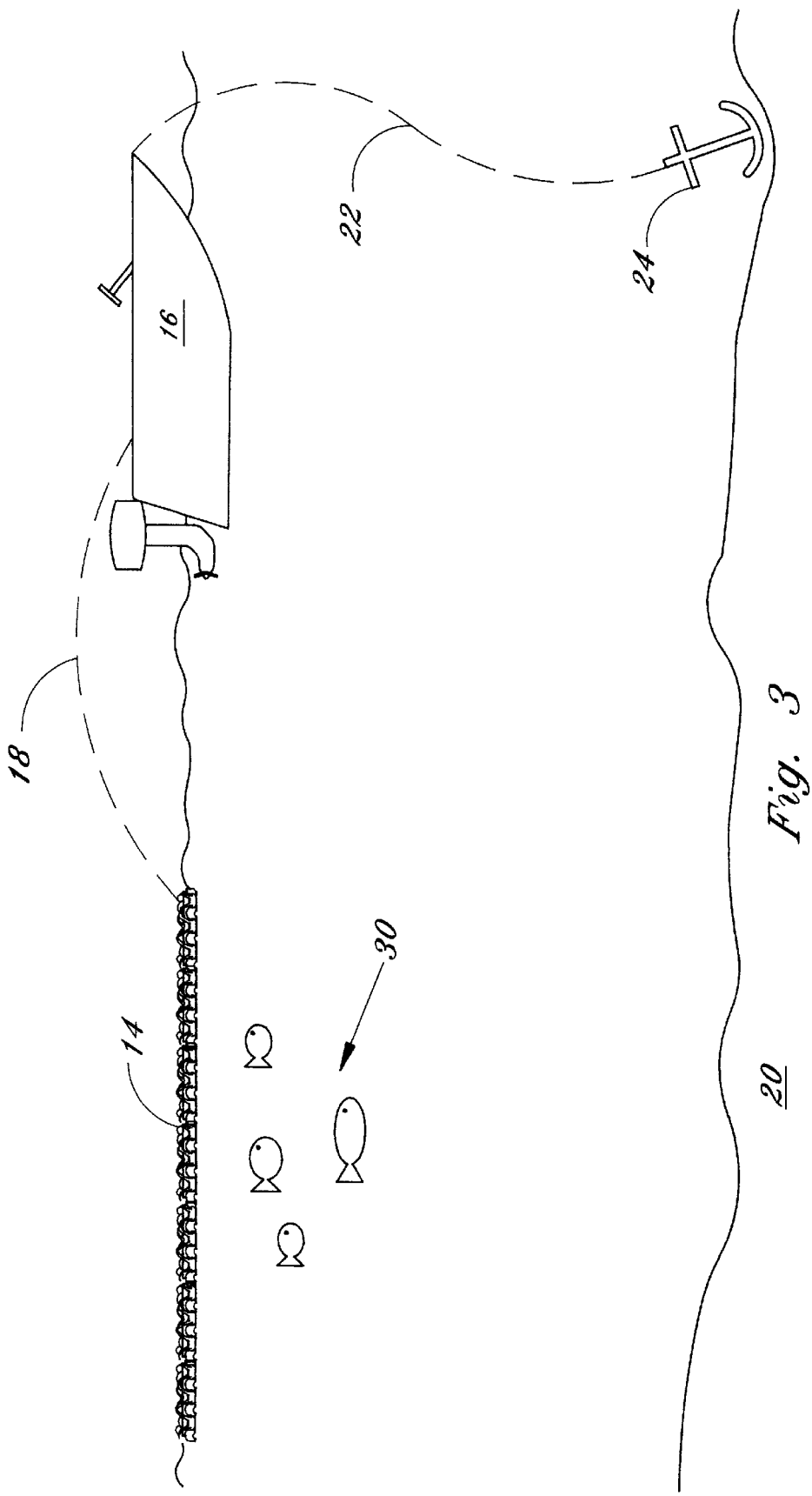
FIG. 3 is a side elevational view of the present invention as used in a body of water.

Referring now to FIG. 3, multiple panels 1 can be tied together with suitable means such as line, straps, or plastic tie wraps to form artificial weed line 14 of any desired size. In use, weed line 14 can be left to drift along with fishing boat 16. In this drifting embodiment, it may be preferable to connect weed line 14 to boat 16 using a suitable length of line 18.

Alternately, weed line 14 can be tied to boat 16 by line 18 and boat 16 can be anchored to bottom 20 by line 22 and anchor 24.

Figure 4:
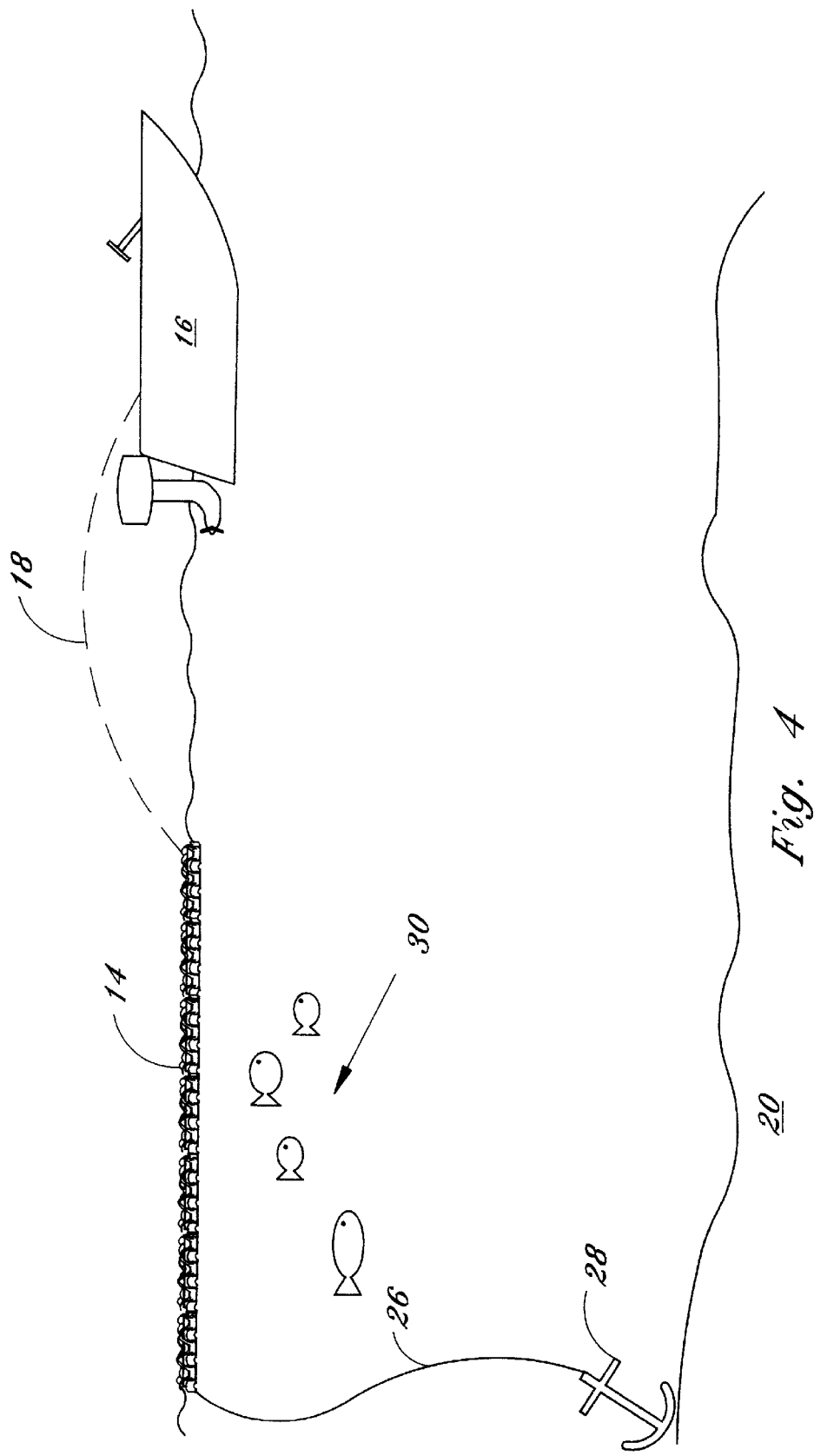
FIG. 4 is a side elevational view of an alternate embodiment of the present invention as used anchored in a body of water.

In an alternate embodiment shown in FIG. 4, weed line 14 can be anchored to bottom 20 by line 26 and anchor 28. Fishing boat 16 can be tied to anchored weed line 14 by line 18.

Alternately, instead of being tied to weed line 14, fishing boat 16 can drift or troll around anchored weed line 14. Depending on the conditions, weed line 14 can be left anchored to bottom 20 for any suitable length of time. Fisherman can repeatedly return to the area with good results as fish 30 will continually congregate under and around weed line 14.

Weed line 14 can be tied to the shore and set out in an outgoing tide for surf fishing. (Not shown).

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A floating artificial weed line comprising:
   a buoyant framework having a perimeter and at least one relatively large aperture;
   means for blocking at least a portion of sun rays from penetrating said at least one aperture, said means for blocking connected to said perimeter, said buoyant framework, with said means for blocking connected, being substantially planar and having a preselected amount of buoyancy sufficient to float substantially horizontally at the surface of a body of water.

2. The floating artificial weed line of claim 1 wherein, said buoyant framework is rectangular.

3. The floating artificial weed line of claim 2 wherein, said buoyant framework is made of water resilient plastic.

4. The floating artificial weed line of claim 2 wherein, said buoyant framework comprises a first and a second elongate members spaced apart and connected by at least a third and a fourth elongate members forming a substantially rectangular buoyant framework.

5. The floating artificial weed line of claim 4 wherein, said first and second elongate members are connected to said at least third and fourth elongate members by means for fastening.

6. The floating artificial weed line of claim 1 wherein, said means for blocking is made of a vinyl sheet having a plurality of apertures disposed in a preselected pattern to allow passage of the sun rays therethrough.

7. The floating artificial weed line of claim 1 wherein, said means for blocking is connected to said perimeter by means for fastening.

8. The floating artificial weed line of claim 1 wherein, said artificial weed line is connected to a fishing boat.

9. The floating artificial weed line of claim 1 wherein, said artificial weed line is anchored to a bottom of the body of water.

10. A floating artificial weed line comprising:
    a first and a second elongate members made of a buoyant material;
    at least a third and a fourth elongate members made of a buoyant material spaced apart and connected perpendicularly between said first and said second elongate members forming an essentially planar rectangular frame with at least one opening of predetermined size;
    a sheet of material connected to said essentially planar rectangular frame and covering said at least one opening, said sheet of material having a plurality of apertures for allowing a predetermined portion of sun rays through said at least one opening, said essentially planar rectangular frame, including said sheet of material connected thereto, having a preselected buoyancy sufficient to float substantially horizontally on the surface of a body of water.

* * * * *